(12) United States Patent
Sasaki

(10) Patent No.: US 7,750,954 B2
(45) Date of Patent: Jul. 6, 2010

(54) CAMERA CONTROL DEVICE

(75) Inventor: Gen Sasaki, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 930 days.

(21) Appl. No.: 10/960,002

(22) Filed: Oct. 8, 2004

(65) Prior Publication Data
US 2005/0083418 A1    Apr. 21, 2005

(30) Foreign Application Priority Data
Oct. 16, 2003    (JP) .............................. 2003-356199

(51) Int. Cl.
H04N 5/76    (2006.01)
(52) U.S. Cl. .............................. 348/231.99; 348/333.01
(58) Field of Classification Search ............ 348/231.99, 348/231.6, 231.7, 231.9, 231.2, 14.1, 222, 348/220.1, 376, 207.99, 222.1, 231.3; 386/117; 455/265; 365/230.02; 358/1.15
See application file for complete search history.

(56) References Cited

U.S. PATENT DOCUMENTS

| | | | | |
|---|---|---|---|---|
| 5,596,724 A | * | 1/1997 | Mullins et al. ................ | 710/71 |
| 5,649,124 A | * | 7/1997 | Kreidl .......................... | 710/305 |
| 5,787,239 A | * | 7/1998 | Horie et al. ................ | 358/1.15 |
| 5,951,666 A | * | 9/1999 | Ilting et al. ................. | 710/71 |
| 5,978,558 A | * | 11/1999 | Huang et al. ................ | 358/1.15 |
| 6,028,807 A | * | 2/2000 | Awsienko ................ | 365/230.02 |
| 6,229,954 B1 | * | 5/2001 | Yamagami et al. .......... | 386/117 |
| 6,272,583 B1 | * | 8/2001 | Sakugawa et al. ............ | 710/307 |
| 6,683,642 B1 | * | 1/2004 | Kobayashi et al. ........ | 348/231.2 |
| 6,897,891 B2 | * | 5/2005 | Itsukaichi ................... | 348/14.1 |
| 7,212,227 B2 | * | 5/2007 | Amling et al. ................ | 348/72 |
| 7,277,973 B2 | * | 10/2007 | Bando ......................... | 710/305 |
| 7,342,574 B1 | * | 3/2008 | Fujioka ....................... | 345/175 |
| 2001/0055064 A1 | * | 12/2001 | Minakami .................... | 348/222 |
| 2002/0131765 A1 | * | 9/2002 | DeKeyser et al. ............. | 386/70 |
| 2002/0154226 A1 | * | 10/2002 | Gohda ...................... | 348/231.3 |
| 2003/0020817 A1 | * | 1/2003 | Kuroiwa ................ | 348/231.99 |
| 2003/0112340 A1 | * | 6/2003 | Okada et al. ............. | 348/220.1 |
| 2003/0174242 A1 | * | 9/2003 | Carmi et al. ................ | 348/376 |
| 2004/0179241 A1 | * | 9/2004 | Saitoh ........................ | 358/302 |
| 2005/0070241 A1 | * | 3/2005 | Northcutt et al. ............ | 455/265 |
| 2008/0062272 A1 | * | 3/2008 | Kuroiwa .................. | 348/222.1 |

FOREIGN PATENT DOCUMENTS

| | | | |
|---|---|---|---|
| JP | 02304486 A | * | 12/1990 |
| JP | 2000-82107 | | 3/2000 |
| JP | 2001-256179 | | 9/2001 |
| JP | 2002-94934 | | 3/2002 |
| JP | 2004-118252 | | 4/2004 |

\* cited by examiner

*Primary Examiner*—Jason Whipkey
*Assistant Examiner*—Dennis Hogue
(74) *Attorney, Agent, or Firm*—Oblon, Spivak, McClelland, Maier & Neustadt, L.L.P.

(57) ABSTRACT

A camera control circuit stores an image picked up by a CCD into an internal memory. A CPU of a main processor circuit gives an instruction of reading out image data stored in the internal memory of the camera control circuit through buses and a slave access controller. The main processor circuit displays the image data which is read out on an LCD and performs other processings. With the above construction, in the electronic equipment having an image pickup function of a camera, it is possible to reduce time for image transfer from the camera control circuit to the main processor circuit.

13 Claims, 18 Drawing Sheets

F I G. 1
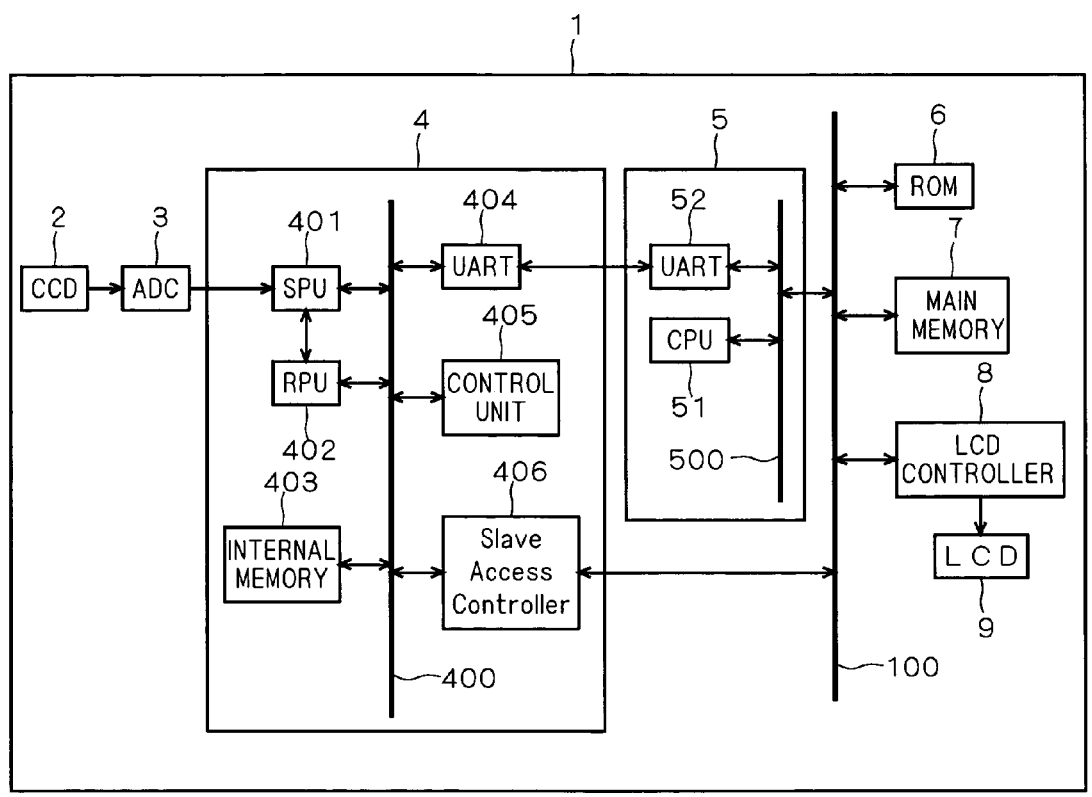

F I G. 2
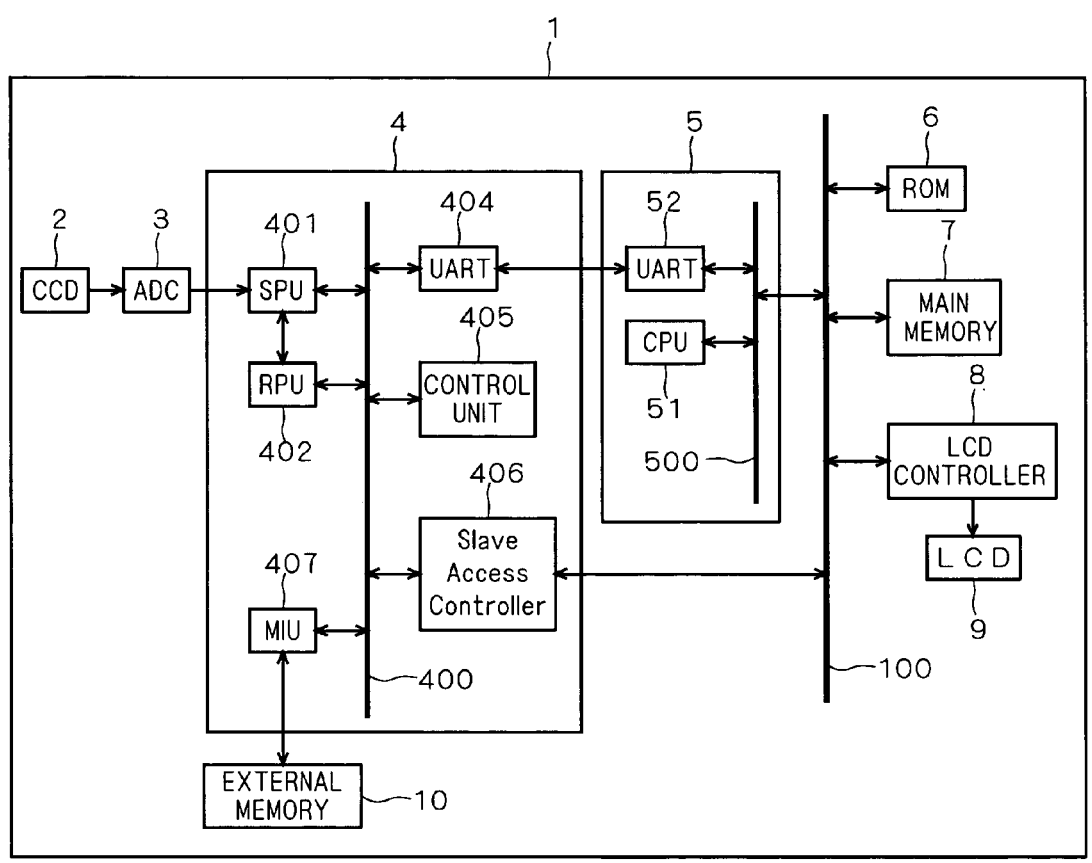

F I G . 7
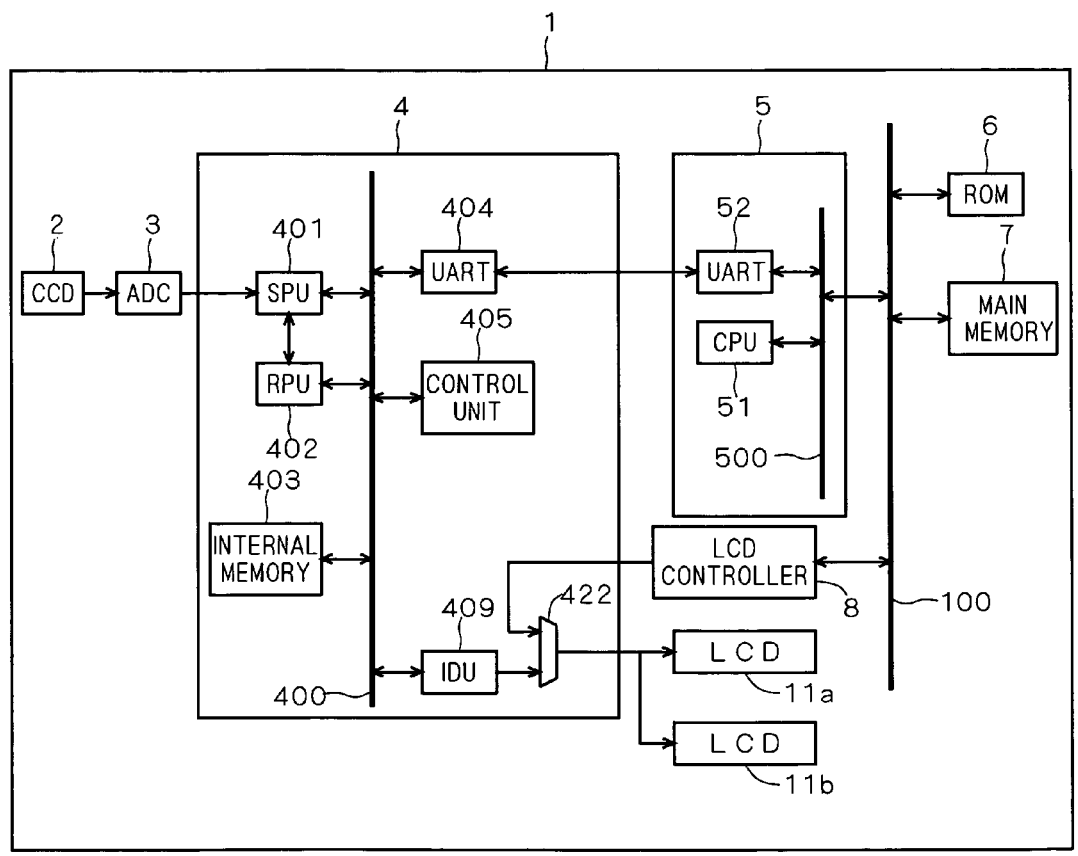

F I G. 9
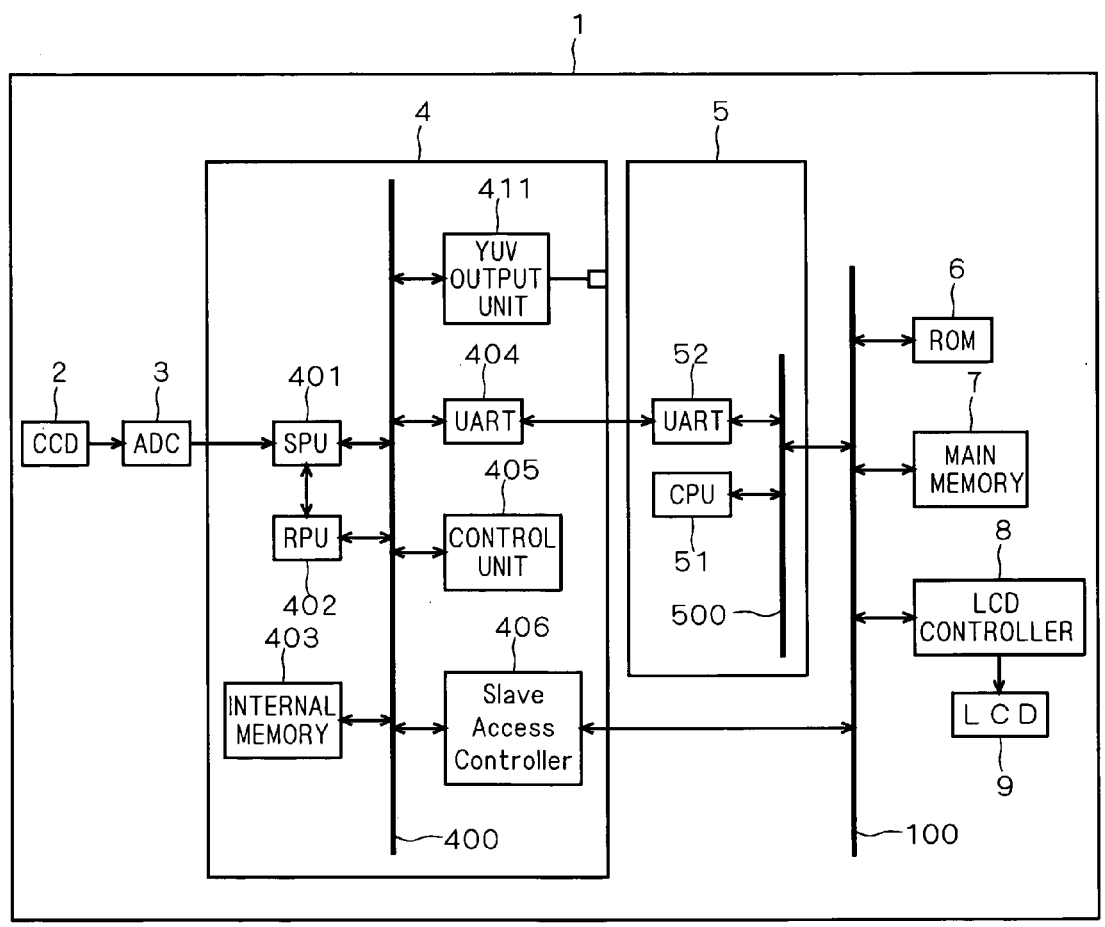

F I G . 1 2
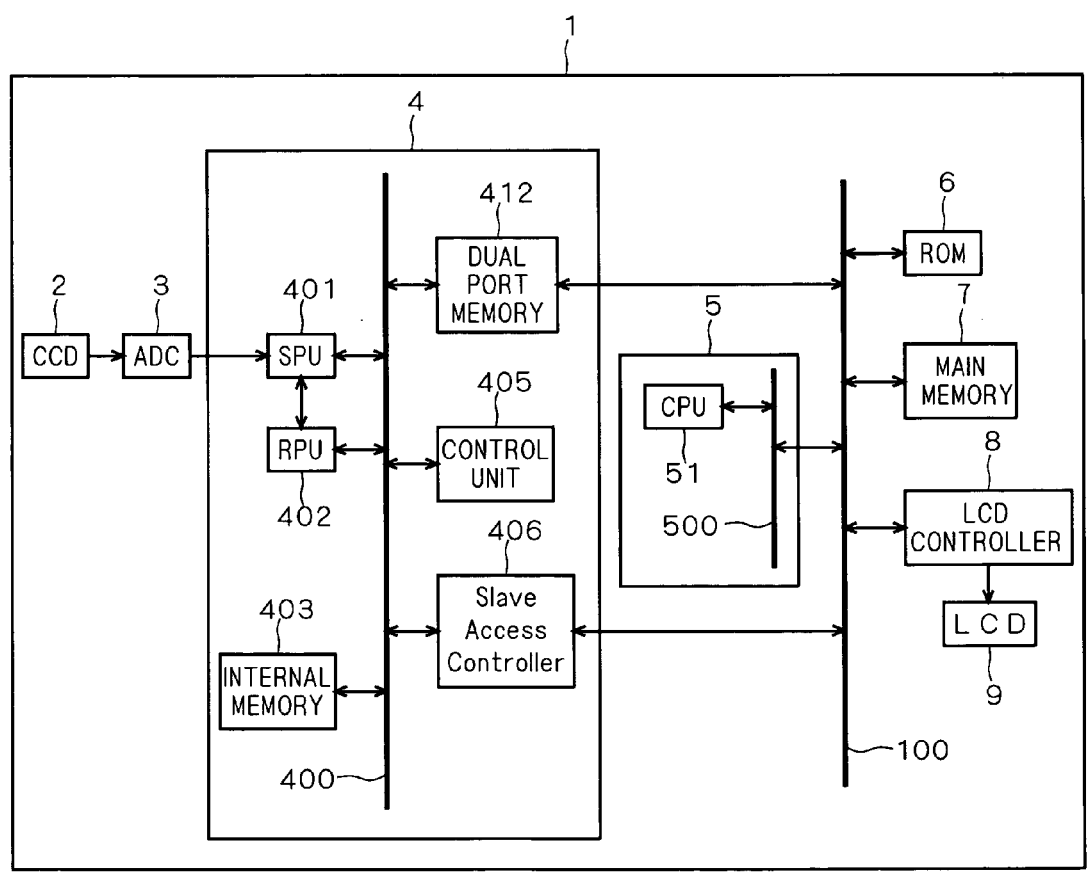

F I G. 1 4
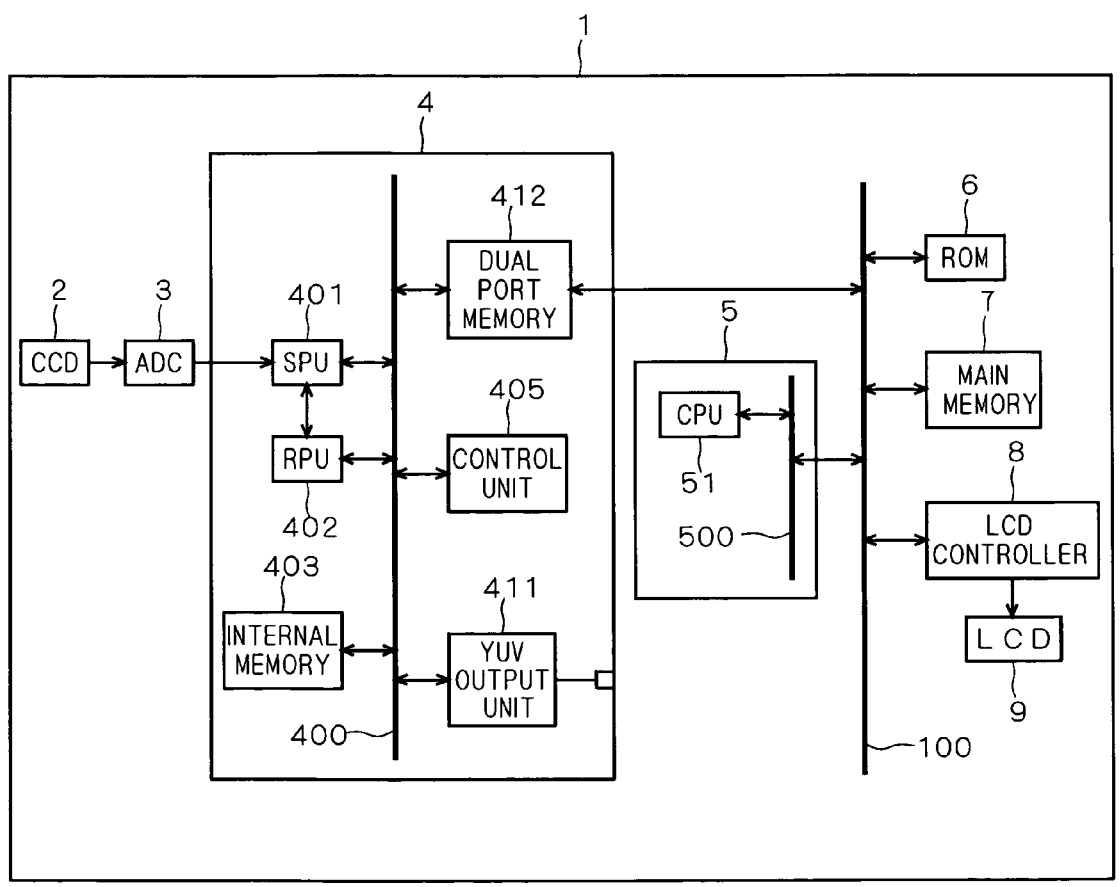

F I G. 1 5
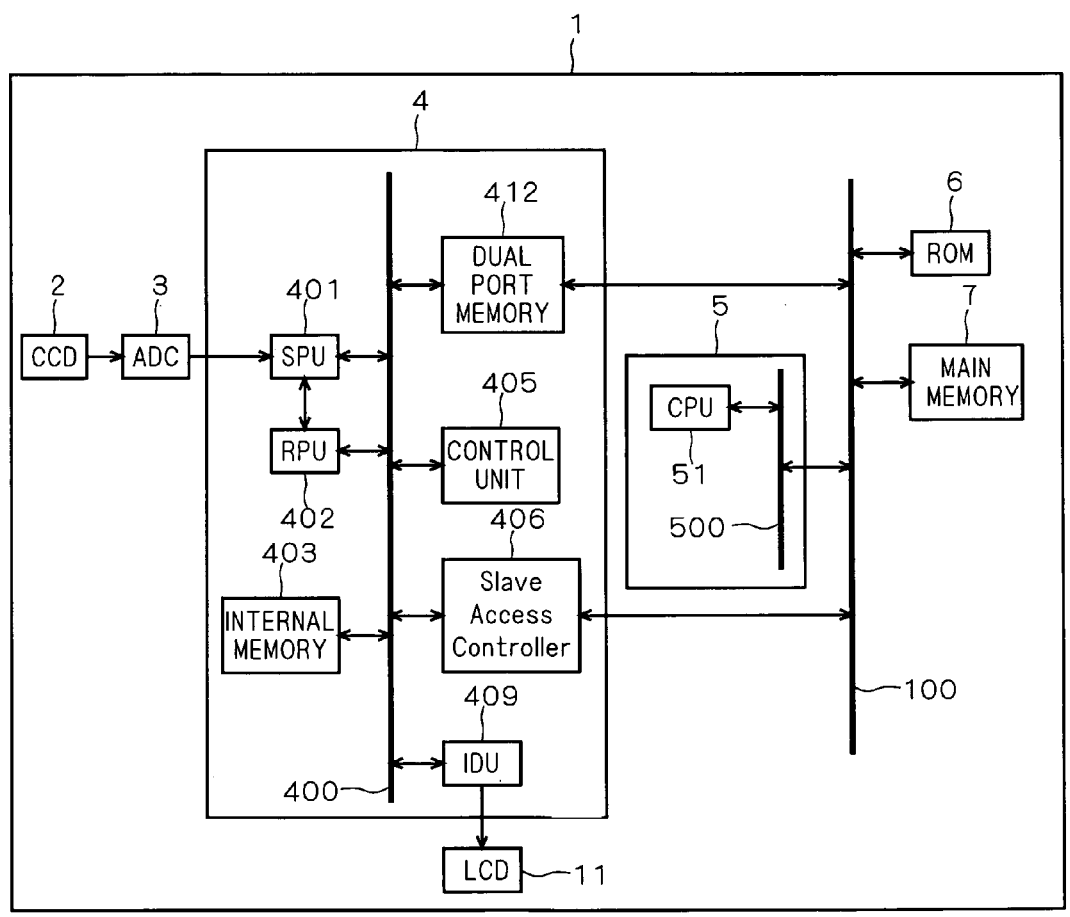

F I G. 17
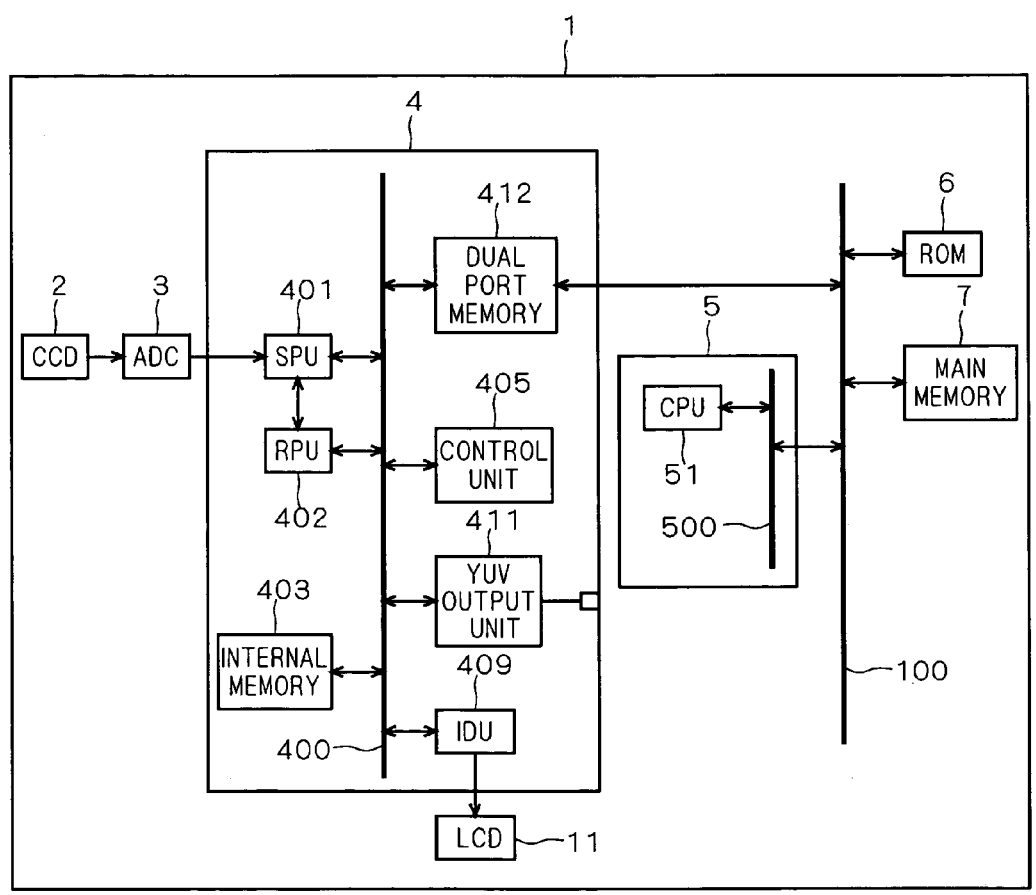

CAMERA CONTROL DEVICE

BACKGROUND OF THE INVENTION

1. Field of the Invention

The present invention relates to a device integrated into an electronic equipment, for processing an image picked up by a camera.

2. Description of the Background Art

In recent, most of cellular phones each comprise a camera. By displaying an image picked up by the camera on a monitor of a cellular phone, the cellular phone can be used like a digital camera. Further, it is also possible to transfer the image picked up by the camera via e-mail.

In order to have an image pickup function, a cellular phone needs not only an image pickup sensor such as CCD but also a camera control circuit for controlling the image pickup sensor to perform an image pickup operation. In the cellular phone, generally, a main processing chip for performing a main processing of cellular phone and a dedicated chip for controlling a camera are integrated. With such a construction, it is possible to give general versatility to LSI chips.

An image outputted from the image pickup sensor by control of the camera controlling chip is inputted to the camera controlling chip. A display control for the monitor is performed by the main processing chip. This needs a system for transferring the images from the camera controlling chip to the main processing chip. Conventionally, for example, an image is transferred between the camera controlling chip and the main processing chip through serial communication. Alternatively, if the main processing chip has an input interface for a YUV signal, the camera controlling chip is provided with an output interface for the YUV signal, thereby transferring the image.

Patent Document 1, Japanese Patent Application Laid Open Gazette No. 2002-94934, discloses a technique to allow an MPU to independently perform with a control bus unaffected during an operation for processing of an image picked up by a camera is carried out.

The method of transferring an image from the camera controlling chip to the main processing chip through serial communication, however, has a problem of low communication speed. Especially, in the recent cellular phone with camera function, the number of pixels in a picked-up image becomes larger and this has a large effect on transfer time. If the main processing chip comprises no YUV input interface, it is impossible to adopt the method of transferring a YUV signal. Further, since an uncompressed YUV image is transferred, this imposes a load on the main processing chip.

The technique disposed in Patent Document 1 is a technique for constructing a dedicated circuit in which a camera control circuit and a main processor circuit are integrated and has no task of adding a camera function by utilizing a general-type main processing chip, and suggests no method for solving the above problem, i.e., for reducing time for data transfer between the camera controlling chip and the main processing chip.

SUMMARY OF THE INVENTION

The present invention is intended for a camera control device integrated into an electronic equipment.

According an aspect of the present invention, the camera control device comprises means for inputting an image signal outputted from an image pickup sensor, a memory device connected to an internal bus inside the camera control device, for storing the image signal outputted from the image pickup sensor and a slave access controller connected to the internal bus and an external bus of the camera control device, and in the camera control device of the present invention, a CPU provided outside the camera control device to perform a general control of the electronic equipment reads out the image signal stored in the memory device through the external bus and the slave access controller.

The camera control device of the present invention allows reduction of transfer time of image data as compared with a case of serial communication.

According another aspect of the present invention, the camera control device comprises means for inputting an image signal outputted from an image pickup sensor, a first display control circuit connected to an internal bus inside the camera control device, a first display device connected to the first display control circuit and a control unit for giving an instruction of displaying an image acquired from the image pickup sensor to the first display control circuit not under control of a CPU provided outside the camera control device to perform a general control of the electronic equipment.

The camera control device of another aspect of the present invention allows elimination of time for transferring the image data to the CPU which performs a general control of the electronic equipment in an operation for image display.

Therefore, it is an object of the present invention to provide a camera control device which allows use of an already-existing main processing chip and high-speed transfer of image to the main processing chip as compared with a case of serial communication.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing a cellular phone including a camera control circuit in accordance with a first preferred embodiment;

FIG. 2 is a block diagram showing a cellular phone including a camera control circuit in accordance with a second preferred embodiment;

FIG. 7 is a block diagram showing a cellular phone including a camera control circuit in accordance with a seventh preferred embodiment;

FIG. 9 is a block diagram showing a cellular phone including a camera control circuit in accordance with a ninth preferred embodiment;

FIG. 12 is a block diagram showing a cellular phone including a camera control circuit in accordance with a twelfth preferred embodiment;

FIG. 14 is a block diagram showing a cellular phone including a camera control circuit in accordance with a fourteenth preferred embodiment;

FIG. 15 is a block diagram showing a cellular phone including a camera control circuit in accordance with a fifteenth preferred embodiment;

FIG. 17 is a block diagram showing a cellular phone including a camera control circuit in accordance with a seventeenth preferred embodiment.

DESCRIPTION OF THE PREFERRED EMBODIMENTS

The First Preferred Embodiment

Figure 3:
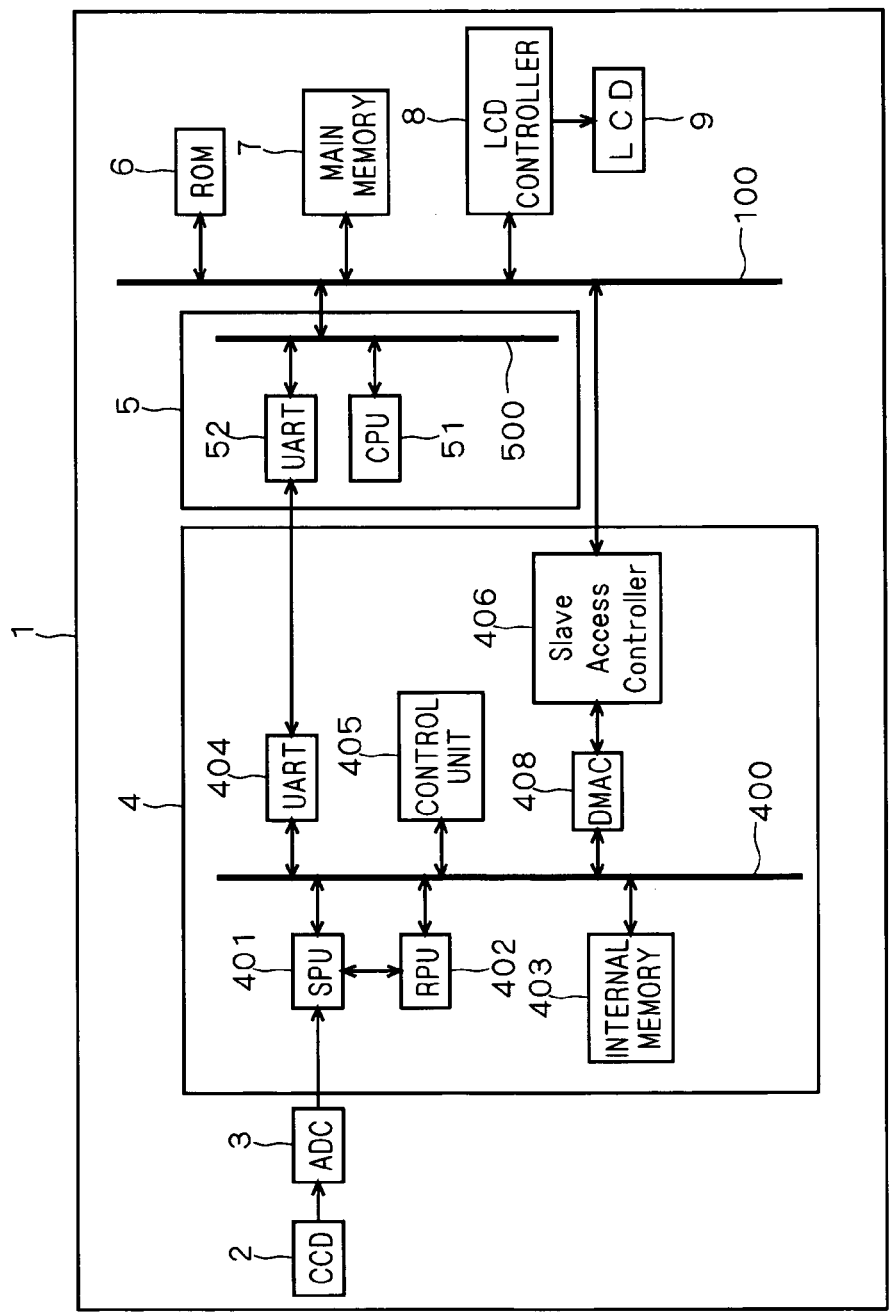
FIG. 3 is a block diagram showing a cellular phone including a camera control circuit in accordance with a third preferred embodiment.

The first preferred embodiment of the present invention will be discussed, referring to FIG. 1. A cellular phone 1 comprises a CCD 2, an ADC (Analog-to-Digital Converter) 3, a camera control circuit 4, a main processor circuit 5, a ROM 6, a main memory 7, an LCD controller 8 and an LCD 9.

The CCD 2 is an image pickup sensor for acquiring an image, which outputs the picked-up image as an analog signal. As the image pickup sensor, a CMOS can be used, besides the CCD. The analog signal of image outputted from the CCD 2 is converted into a digital signal in the ADC 3 and then inputted to the camera control circuit 4.

The camera control circuit 4 comprises an SPU (Signal Processing Unit) 401, a RPU (Real-time Processing Unit) 402, an internal memory 403, an UART 404, a control unit 405 and a slave access controller (hereinafter, referred to as SAC) 406, and these modules are connected to one another with a bus 400.

The SPU 401 performs processing such as a defective pixel correction on the inputted digital image signal and then outputs an image signal to the bus 400 or the RPU 402. The RPU 402 has a function of performing various digital image processings, such as shading correction, pixel interpolation, gamma correction, color space conversion, edge enhancement and resolution conversion, in real time on the image signal inputted from the SPU 401. The control unit 405 includes a CPU for controlling the camera control circuit 4, and the image signal outputted to the bus 400 from the RPU 402 or the SPU 401 is stored into the internal memory 403 as image data under the control of the control unit 405.

Further, the control unit 405 allows execution of a compression program on the image data. The control unit 405 allows compressive coding of image data and decoding of the compressively-coded image data, and for example, controls to perform compression of image data in a compression system such as JPEG. Furthermore, the control unit 405 executes a communication program to ensure serial communication through the UART 404 serving as an interface for serial communication. As the serial communication interface, an SPI (Serial Peripheral Interface) may be used.

The SAC 406 has a function of getting access to the internal memory 403 from an external bus not under the control of the control unit 405 in the camera control circuit 4. The SAC 406 is connected to the bus 400 which is an internal bus of the camera control circuit 4 and a bus 100 provided outside the camera control circuit 4. The bus 100 is controlled by a CPU 51 of the main processor circuit 5. The CPU 51 can get access to the internal memory 403 connected to the bus 400 not under the control of the CPU 51, through the SAC 406.

The main processor circuit 5 comprises the CPU 51 and an UART 52. The CPU 51 and the UART 52 are connected with a bus 500 provided inside the main processor circuit 5. The bus 500 is connected to the bus 100 provided outside the main processor circuit 5 through a controller (not shown), and the CPU 51 performs control of the buses 500 and 100.

To the bus 100 connected are the ROM 6 and the main memory 7, and the CPU 51 executes various programs stored in the ROM 6 or the main memory 7, to achieve various functions of the cellular phone 1. Further, the CPU 51 executes the communication program, to achieve serial communication through the UART 52.

The above-discussed UART 404 of the camera control circuit 4 and the UART 52 are connected to each other with a line for serial communication, to thereby ensure serial communication between the main processor circuit 5 and camera control circuit 4. As discussed above, though image data is conventionally transferred through such a serial communication interface, another method for transfer of image data is adopted in the first preferred embodiment. Therefore, in the first preferred embodiment, the serial communication interface is used for another purpose. For example, the serial communication interface is used for transfer of a startup program for the camera control circuit 4 from the main processor circuit 5.

To the bus 100 connected is the LCD controller 8. The LCD controller 8 receives an instruction from the CPU 51, to perform drawing of the image data on the LCD 9. The LCD controller 8 is a dedicated controller for the LCD 9 in the cellular phone 1. In general, LCDs in most of cellular phones each have a memory therein, and if the LCD controller 8 once performs an operation of displaying the image data, the display can be maintained.

In the first preferred embodiment, the camera control circuit 4 and the main processor circuit 5 are each constructed as an LSI chip and these LSI chips are provided on a printed circuit board inside the cellular phone 1. The bus 500 of the main processor circuit 5 and the bus 100 provided on the printed circuit board are connected to each other through a controller, and the bus 400 of the camera control circuit 4 and the bus 100 are connected to each other through the SAC 406. Further, the ROM 6, the main memory 7, the LCD controller 8 or the like are provided on the printed circuit board, and these constituents are connected to one another with the bus 100.

In the above construction, first, when an image is picked up by the CCD 2, an image signal is converted into a digital signal in the ADC 3 and then inputted to the camera control circuit 4. The image signal inputted into the camera control circuit 4 is subjected to various image processings in the SPU 401 and the RPU 402, and then stored into the internal memory 403 as image data. Further, in the control unit 405, compression is performed on the image data stored in the internal memory 403 and then the compressed image data is stored into the internal memory 403.

Next, the CPU 51 of the main processor circuit 5 performs a read operation of the compressed image data stored in the internal memory 403. At this time, a read instruction signal is given to the SAC 406 through the buses 500 and 100. When the SAC 406 receives the instruction from the CPU 51, of reading data out from the internal memory 403, the control unit 405 gets access to the internal memory 403 and transfers data from the internal memory 403 to the SAC 406. Then, the SAC 406 transfers the compressed image data acquired from the internal memory 403 to the main processor circuit 5 through the bus 100. The compressed image data transferred to the main processor circuit 5 is processed by the CPU 51 or written into the main memory 7.

When the image picked up by the CCD 2 is thus transferred to the main processor circuit 5, the CPU 51 executes various programs, to thereby display an image on the LCD 9, send the picked-up image as an attached image of an e-mail, and so on.

In the first preferred embodiment, when the main processor circuit 5 needs the image data stored in the internal memory 403 of the camera control circuit 4, since the image data is transferred from the camera control circuit 4 to the main processor circuit 5 through the SAC 406 and the buses, transfer of image data can be achieved at higher speed as compared with conventional transfer through serial communication. Further, in the camera control circuit 4, it is possible to reduce the time required for operations since the image data is compressed and then transferred. Furthermore, since it is not necessary to perform image compression in the main processor circuit 5, it is possible to reduce the load on the CPU 51.

The Second Preferred Embodiment

Next, the second preferred embodiment of the present invention will be discussed, referring to FIG. 2. Constituent elements of the second preferred embodiment identical to those of the first preferred embodiment (FIG. 1) are represented by the same reference signs in FIG. 2, and description thereof will be omitted in this preferred embodiment.

The second preferred embodiment is different from the first preferred embodiment in that an external memory 10 is connected to the camera control circuit 4. The external memory 10 is, e.g., an SDRAM and connected to the bus 400 through an MIU (Memory Interface Unit) 407.

In the above construction, when an image is picked up by the CCD 2, an image signal is converted into a digital signal in the ADC 3 and then inputted to the camera control circuit 4. The image signal inputted into the camera control circuit 4 is subjected to various image processings in the SPU 401 and the RPU 402, and then stored into the external memory 10 as image data. Further, in the control unit 405, compression is performed on the image data stored in the external memory 10 and then the compressed image data is stored into the external memory 10.

Next, the CPU 51 of the main processor circuit 5 performs a read operation of the compressed image data stored in the external memory 10. At this time, a read instruction signal is given to the SAC 406 through the buses 500 and 100. When the SAC 406 receives the instruction from the CPU 51, of reading data out from the external memory 10, the control unit 405 gets access to the external memory 10 and transfers data from the external memory 10 to the SAC 406. Then, the SAC 406 transfers the compressed image data acquired from the external memory 10 to the main processor circuit 5 through the bus 100. The compressed image data transferred to the main processor circuit 5 is processed by the CPU 51 or written into the main memory 7.

Also in the second preferred embodiment, since the image data is transferred from the camera control circuit 4 to the main processor circuit 5 through the SAC 406 and the buses, transfer of image data can be achieved at higher speed as compared with conventional transfer through serial communication. Further, as compared with the first preferred embodiment, by using the external memory 10, it is possible to provide a data memory device having relatively large capacity in the cellular phone.

The Third Preferred Embodiment

Next, the third preferred embodiment of the present invention will be discussed, referring to FIG. 3. Constituent elements of the third preferred embodiment identical to those of the first preferred embodiment (FIG. 1) are represented by the same reference signs in FIG. 3, and description thereof will be omitted in this preferred embodiment.

The third preferred embodiment is different from the first preferred embodiment in that the camera control circuit 4 further comprises a DMAC (Direct Memory Access Controller) 408.

First, when an image is picked up by the CCD 2, an image signal is converted into a digital signal in the ADC 3 and then inputted to the camera control circuit 4. The image signal inputted into the camera control circuit 4 is subjected to various image processings in the SPU 401 and the RPU 402, and then stored into the internal memory 403 as image data. Further, in the control unit 405, compression is performed on the image data stored in the internal memory 403 and then the compressed image data is stored into the internal memory 403.

Next, the CPU 51 of the main processor circuit 5 performs a read operation of the compressed image data stored in the internal memory 403. At this time, a read instruction signal is given to the SAC 406 through the buses 500 and 100. When the SAC 406 receives the instruction, the DMAC 408, instead of the control unit 405, transfers the compressed image data stored in the internal memory 403 to the SAC 406. Then, the SAC 406 transfers the compressed image data acquired from the internal memory 403 to the main processor circuit 5 through the bus 100. The compressed image data transferred to the main processor circuit 5 is processed by the CPU 51 or written into the main memory 7.

Also in the third preferred embodiment, since the image data is transferred from the internal memory 403 to the main processor circuit 5 through the SAC 406 and the buses, transfer of image data can be achieved at higher speed as compared with conventional transfer through serial communication. Further, as compared with the first preferred embodiment, since the DMAC 408 performs data transfer to the main processor circuit 5, it is possible to reduce the load on the CPU 51.

The Fourth Preferred Embodiment

Figure 4:
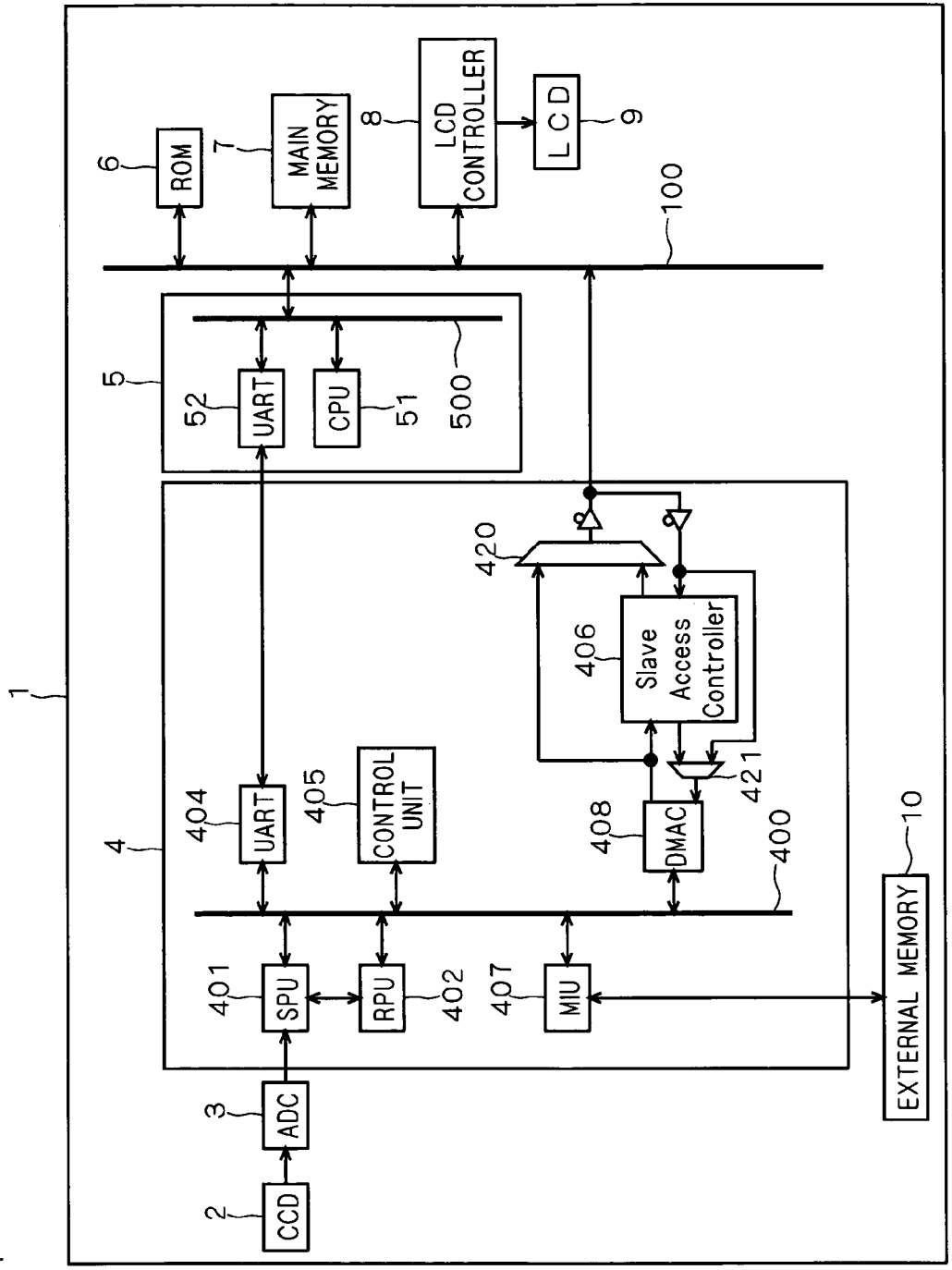
FIG. 4 is a block diagram showing a cellular phone including a camera control circuit in accordance with a fourth preferred embodiment.

Next, the fourth preferred embodiment of the present invention will be discussed, referring to FIG. 4. Constituent elements of the fourth preferred embodiment identical to those of the second preferred embodiment (FIG. 2) are represented by the same reference signs in FIG. 4, and description thereof will be omitted in this preferred embodiment.

The fourth preferred embodiment is different from the second preferred embodiment in that the camera control circuit 4 further comprises a DMAC (Direct Memory Access Controller) 408 and selectors 420 and 421. The selector 420 has a function of selectively outputting either of an input signal from the DMAC 408 and an input signal from the SAC 406 to the outside of the camera control circuit 4. Further, the selector 421 has a function of selectively outputting either of an input signal from the outside of the camera control circuit 4 and an input signal from the SAC 406 to the DMAC 408.

First, discussion will be made on a mode where a first selection signal is given to the selector 420 and the selector 420 outputs the input signal from the SAC 406. In accordance with the procedure of the second preferred embodiment, when the compressed image data is stored into the external memory 10, the CPU 51 of the main processor circuit 5 subsequently performs a read operation of the compressed image data stored in the external memory 10 through the SAC 406. Next, the DMAC 408, instead of the control unit 405, performs transfer of the compressed image data from the external memory 10 to the SAC 406. The SAC 406 transfers the compressed image data which is thus acquired to the main processor circuit 5. Further, when the operation in this mode is performed, the selector 421 is controlled to output the input signal from the SAC 406 to the DMAC 408.

Next, on the other hand, discussion will be made on a mode where a second selection signal is given to the selector 420 and the selector 420 outputs the input signal from the DMAC 408. In this mode, the selector 421 is controlled to output the input signal from the outside of the camera control circuit 4 to the DMAC 408. Therefore, this is a mode where the DMAC 408 comprises an interface for direct input/output of a signal from/to the outside of the camera control circuit 4. This mode is a mode used to connect the camera control circuit 4 and another LSI chip comprising an external DMA interface. In this mode, it is possible to perform a data exchange between the camera control circuit 4 and the LSI chip through the external DMA transfer.

Also in the fourth preferred embodiment, if the first selection signal is given to the selector 420, since the image data is transferred from the external memory 10 to the main processor circuit 5 through the SAC 406 and the buses, transfer of image data can be achieved at higher speed as compared with conventional transfer through serial communication. Further, as compared with the second preferred embodiment, since the DMAC 408 performs data transfer to the main processor circuit 5, it is possible to reduce the load on the CPU 51.

The Fifth Preferred Embodiment

Figure 5:
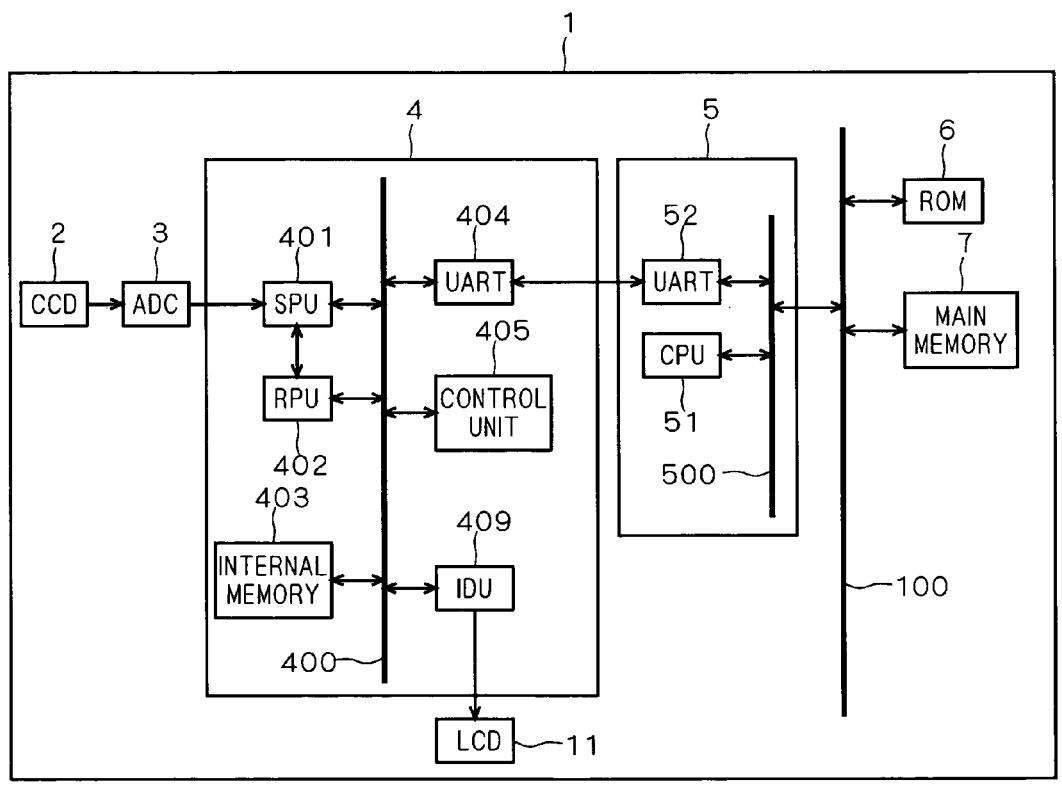
FIG. 5 is a block diagram showing a cellular phone including a camera control circuit in accordance with a fifth preferred embodiment.

The fifth preferred embodiment of the present invention will be discussed, referring to FIG. 5. Constituent elements of the fifth preferred embodiment identical to those of the first preferred embodiment (FIG. 1) are represented by the same reference signs in FIG. 5, and description thereof will be omitted in this preferred embodiment.

The fifth preferred embodiment is different from the first preferred embodiment in that the camera control circuit 4 further comprises an IDU (Image Display Unit) 409 and an LCD 11 is connected to the camera control circuit 4. Further, the camera control circuit 4 does not comprise the SAC 406 of FIG. 1. The IDU 409 is a display unit adapted to an LCD for TV and an LCD for DSC (Digital Still Camera) and has a function of always outputting data to the LCD having no memory. Combination of the LCD controller 8 and the LCD 9 of FIG. 1, however, may be also used in the fifth preferred embodiment.

When an image is picked up by the CCD 2, an image signal is converted into a digital signal in the ADC 3 and then inputted to the camera control circuit 4. The image signal inputted into the camera control circuit 4 is subjected to various image processings in the SPU 401 and the RPU 402, and then stored into the internal memory 403 as image data. Further, in the control unit 405, compression is performed on the image data stored in the internal memory 403 and then the compressed image data is stored into the internal memory 403.

Next, serial communication is performed between the CPU 51 of the main processor circuit 5 and the control unit 405 of the camera control circuit 4 and an instruction for image display is thereby given from the CPU 51. Specifically, the serial communication is performed between the UARTs 52 and 404. On receiving the instruction of image display from the CPU 51, the control unit 405 reads out the compressed image data from the internal memory 403, decodes the compressed image data and gives an instruction of image display to the IDU 409. The IDU 409 thereby performs an image display on the LCD 11.

In the fifth preferred embodiment, in displaying the image data stored in the internal memory 403 of the camera control circuit 4 on the LCD, since the camera control circuit 4 performs a direct control of image display to display an image on the LCD 11, it is possible to eliminate the time required for image transfer from the camera control circuit 4 to the main processor circuit 5 and reduce the load on the main processor circuit 5. Moreover, in displaying an image, since the camera control circuit 4 also performs decoding of the compressed image data, it is possible to further reduce the load on the CPU 51 of the main processor circuit 5.

Further, In an operation for sending an image attached to an e-mail, which needs less degree of real time as compared with the display operation on the LCD, the image data may be transferred from the camera control circuit 4 to the main processor circuit 5 through serial communication.

The Sixth Preferred Embodiment

Figure 6:
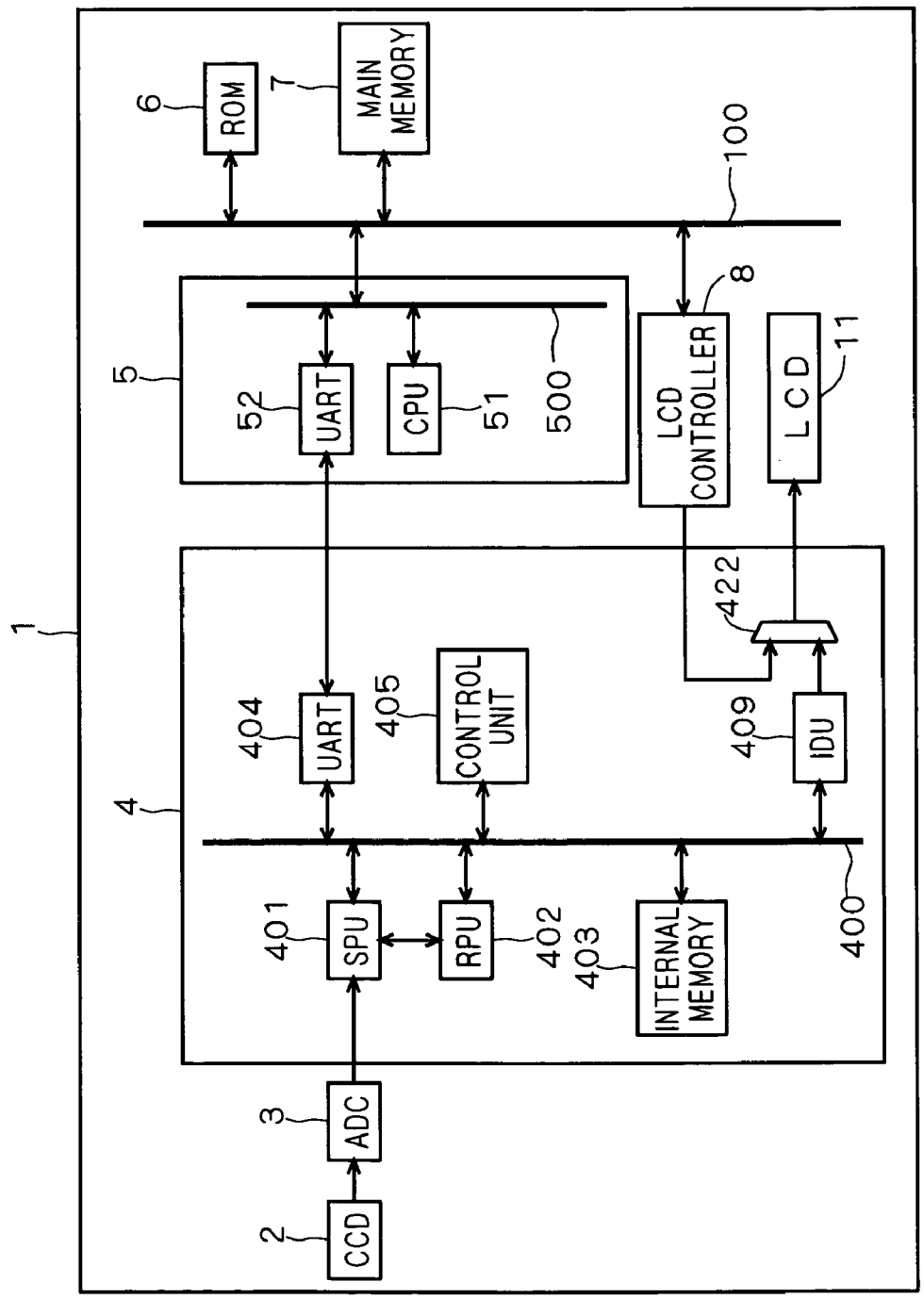
FIG. 6 is a block diagram showing a cellular phone including a camera control circuit in accordance with a sixth preferred embodiment.

Next, the sixth preferred embodiment of the present invention will be discussed, referring to FIG. 6. Constituent elements of the sixth preferred embodiment identical to those of the fifth preferred embodiment (FIG. 5) are represented by the same reference signs in FIG. 6, and description thereof will be omitted in this preferred embodiment.

The sixth preferred embodiment is different from the fifth preferred embodiment in that the LCD controller 8 is provided in the cellular phone 1, which is controlled by the CPU 51 of the main processor circuit 5 connected to the bus 100, and a selector 422 is provided in the camera control circuit 4, which selectively outputs image data outputted from the IDU 409 or the LCD controller 8 to the LCD 11.

In accordance with the procedure of the fifth preferred embodiment, when the compressed image data is stored into the internal memory 403, the CPU 51 subsequently gives the instruction for display of the image data on the LCD 11. At that time, the CPU 51 gives the display instruction to the camera control circuit 4 or the LCD controller 8 depending on the type of image to be displayed.

For example, in order to display the image picked up by the CCD 2 on the LCD 11, in accordance with the procedure of the fifth preferred embodiment, the display instruction is given to the control unit 405 through serial communication. The control unit 405 reads out the compressed image data stored in the internal memory 403, decodes the image data and gives the display instruction to the IDU 409. In this case, the selector 422 is controlled to output the input signal from the IDU 409 to the LCD 11.

Further, in order to make a telephone number display and a character display for e-mail which are required in use of the cellular phone 1, the CPU 51 gives these display instructions to the LCD controller 8. In this case, the selector 422 is controlled to output the input signal from the LCD controller 8 to the LCD 11.

Also in the sixth preferred embodiment, in displaying the image data stored in the internal memory 403 of the camera control circuit 4 on the LCD, since the camera control circuit 4 performs a direct control for image display on the LCD 11, it is possible to eliminate the time required for transferring the image from the camera control circuit 4 to the main processor circuit 5 and reduce the load on the main processor circuit 5. Further, since it is possible to switch between the display control by the camera control circuit 4 and that by the main processor circuit 5 depending on the type of image to be displayed, the loads on the CPUs can be dispersed and efficiency becomes higher.

The Seventh Preferred Embodiment

Next, the seventh preferred embodiment of the present invention will be discussed, referring to FIG. 7. Constituent elements of the seventh preferred embodiment identical to those of the sixth preferred embodiment (FIG. 6) are represented by the same reference signs in FIG. 7, and description thereof will be omitted in this preferred embodiment.

The seventh preferred embodiment is different from the sixth preferred embodiment in that two LCDs 11a and 11b are provided in the cellular phone 1, for displaying the image data outputted from the selector 422. For example, some of folding cellular phones each have an internal large LCD and an external small LCD. Then, the LCD 11a can be used as the internal large LCD and the LCD 11b can be used as the external small LCD.

For example, in order to display an image picked up by the CCD 2 or various information on the LCD 11a, in accordance with the procedure of the sixth preferred embodiment, the CPU 51 gives the instruction for image display to the control unit 405 through serial communication. The control unit 405 gives the instruction of displaying the image data stored in the internal memory 403 to the IDU 409. In this case, the selector 422 is controlled to output the input signal from the IDU 409. Further, a not-shown selector circuit controls the signal outputted from the selector 422 to be outputted to the LCD 11a.

Furthermore, in order to make a telephone number display and a date display on the LCD 11b, the CPU 51 gives these display instructions to the LCD controller 8. In this case, the selector 422 is controlled to output the input signal from the LCD controller 8. Further, a not-shown selector circuit controls the signal outputted from the selector 422 to be outputted to the LCD 11b.

Also in the seventh preferred embodiment, in displaying the image data stored in the internal memory 403 of the camera control circuit 4 on the LCD, since the camera control circuit 4 performs a direct control for image display on the LCD 11, it is possible to eliminate the time required for transferring the image from the camera control circuit 4 to the main processor circuit 5 and reduce the load on the main processor circuit 5. Further, since it is possible to switch between the display control by the camera control circuit 4 and that by the main processor circuit 5 depending on the type of image data to be displayed, the loads on the CPUs can be dispersed and efficiency becomes higher.

The Eighth Preferred Embodiment

Figure 8:
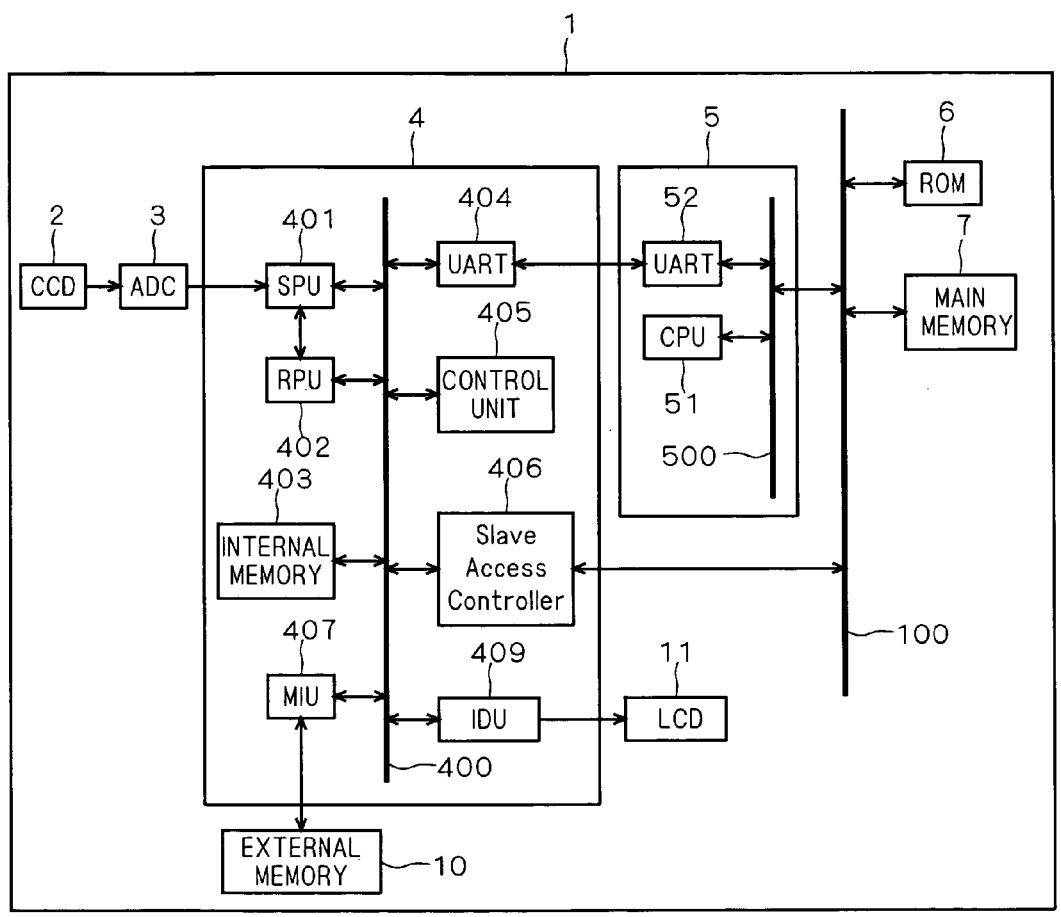
FIG. 8 is a block diagram showing a cellular phone including a camera control circuit in accordance with an eighth preferred embodiment.

Next, the eighth preferred embodiment of the present invention will be discussed, referring to FIG. 8. The eighth preferred embodiment has both the function of the first preferred embodiment shown in FIG. 1 and that of the fifth preferred embodiment shown in FIG. 5. As shown in FIG. 8, the camera control circuit 4 comprises the SAC 406 and the IDU 409, and the SAC 406 is connected to the bus 100 and the LCD 11 is connected to the IDU 409. Though the camera control circuit 4 comprises the internal memory 403 and is connected to the external memory 10 in FIG. 8, the camera control circuit 4 may have either of theses memories. Further, the image data picked up by the CCD 2 may be stored into either of the internal memory 403 and the external memory 10.

In the eighth preferred embodiment, in displaying the picked-up image on the LCD 11, since the camera control circuit 4 performs the display control, it is possible to eliminate the time required for transferring the image data from the camera control circuit 4 to the main processor circuit 5 and reduce the load on the main processor circuit 5. In processing the picked-up image in the main processor circuit 5, since the image data is transferred from the camera control circuit 4 to the main processor circuit 5 through the buses and the SAC 406, it is possible to reduce the transfer time as compared with the case of serial communication. Further, the main processor circuit 5 can perform display control on the LCD 11 through the buses and the SAC 406.

Discussion will be made on an operation of the eighth preferred embodiment. In order to process an image outputted from the CCD 2 to send it as an e-mail or store it into the main memory 7, it is only necessary to perform compression of the image data in the camera control circuit 4 and then read out the compressed image data by the main processor circuit 5 through the buses and the SAC 406. In order to display an image attached to an e-mail received by the cellular phone 1 or the compressed image data stored in the main memory 7 on the LCD 11, the main processor circuit 5 reads out the compressed image data from the main memory 7 or the like and transfers the compressed image data to the internal memory 403 in the camera control circuit 4 or the external memory 10 through the buses and the SAC 406. Then, the camera control circuit 4 performs decompression of the compressed image data and after that, displays the image data on the LCD 11.

Thus, since the camera control circuit 4 performs compression of the image and then the main processor circuit 5 reads out the compressed image data, it is not necessary to perform compression in the main processor circuit 5 and it is therefore possible to reduce the load on the CPU 51. Further, since the compressed image data is read out, the transfer time can be reduced. Furthermore, also in displaying the compressed image data on the LCD 11, since the main processor circuit 5 transfers the compressed image data to the camera control circuit 4, the transfer time can be reduced. Moreover, since the decompression is performed in the camera control circuit 4, it is possible to reduce the load on the CPU 51.

The Ninth Preferred Embodiment

Next, the ninth preferred embodiment of the present invention will be discussed, referring to FIG. 9. The camera control circuit 4 of the ninth preferred embodiment is different from that of the first preferred embodiment (FIG. 1) in that the camera control circuit 4 of the ninth preferred embodiment further comprises a YUV output unit 411. The YUV output unit 411 is an interface for outputting the image signal picked up by the CCD 2 as a YUV signal.

Also in the ninth preferred embodiment, since the image data is transferred from the camera control circuit 4 to the main processor circuit 5 through the buses and the SAC 406, like in the first preferred embodiment, it is possible to reduce the transfer time as compared with the case of serial communication.

Though the main processor circuit 5 of FIG. 9 comprises no interface for inputting the YUV signal, the camera control circuit 4 of the ninth preferred embodiment can transfer the image data through a YUV interface if connected to a main processor circuit comprising an interface for inputting the YUV signal. Thus, since the camera control circuit 4 of the ninth preferred embodiment transfers the image data to the main processor circuit through the buses if the main processor circuit has no YUV interface and transfers the YUV signal to the main processor circuit through the YUV interface if the main processor circuit has the YUV interface, the camera control circuit 4 of the ninth preferred embodiment can be adapted to various types of main processor circuits.

The Tenth Preferred Embodiment

Next, the tenth preferred embodiment of the present invention will be discussed, referring to FIG. 10. The camera control circuit 4 of the tenth preferred embodiment is different from that of the fifth preferred embodiment (FIG. 5) in that the camera control circuit 4 of the tenth preferred embodiment further comprises the YUV output unit 411. The YUV output unit 411 is an interface for outputting the image signal picked up by the CCD 2 as a YUV signal.

Also in the tenth preferred embodiment, since the camera control circuit 4 performs a control for display of the image picked up by the CCD 2, to thereby display the image on the LCD 11, like in the fifth preferred embodiment, it is possible to eliminate the time required for transferring the image from the camera control circuit 4 to the main processor circuit 5 and reduce the load on the main processor circuit 5.

Figure 10:
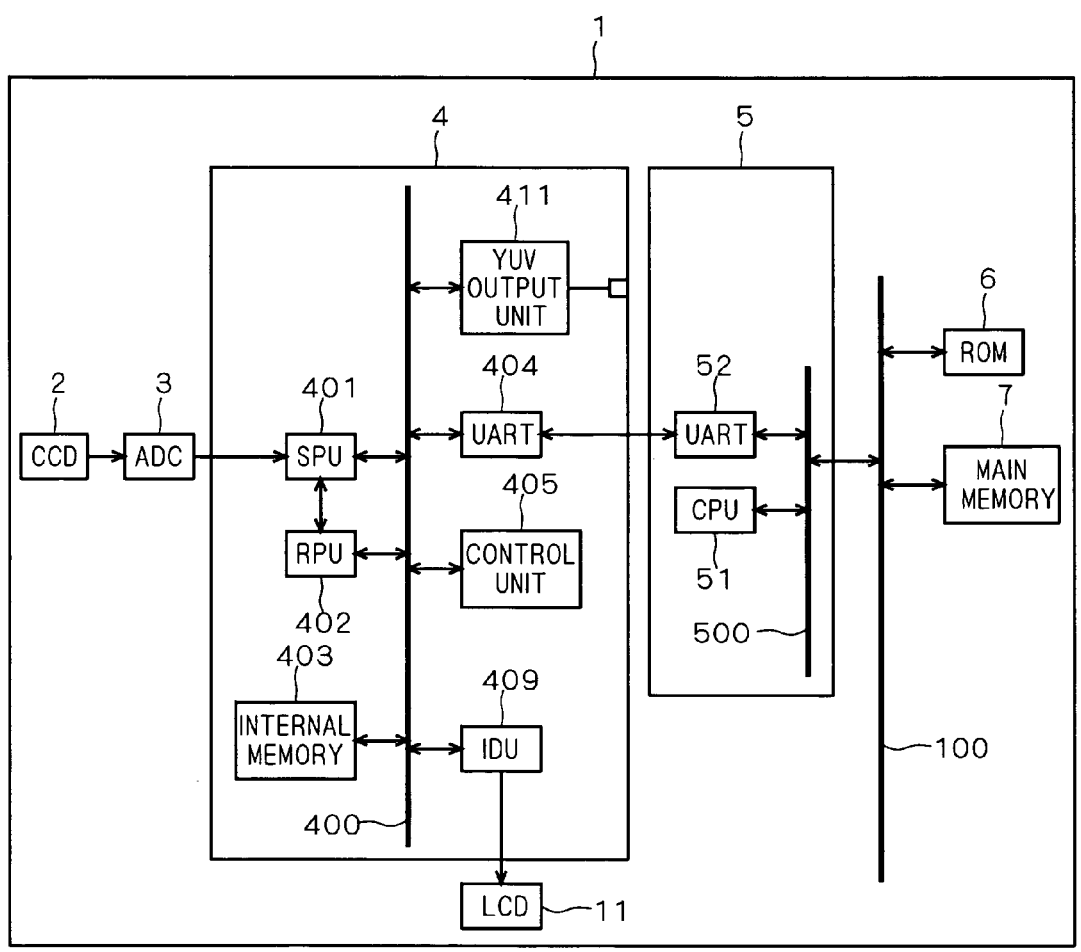
FIG. 10 is a block diagram showing a cellular phone including a camera control circuit in accordance with a tenth preferred embodiment.

Though the main processor circuit 5 of FIG. 10 comprises no interface for inputting the YUV signal, the camera control circuit 4 of the tenth preferred embodiment can transfer the image data through a YUV interface if connected to a main processor circuit comprising an interface for inputting the YUV signal. If the camera control circuit 4 of the tenth preferred embodiment is connected to a main processor circuit having an interface for inputting the YUV signal, in processing the image data in the main processor circuit, since the image data can be transferred through the YUV interface, it is possible to reduce the transfer time as compared with the case of transferring the image data through serial communication.

The Eleventh Preferred Embodiment

Next, the eleventh preferred embodiment of the present invention will be discussed, referring to FIG. 11. The camera control circuit 4 of the eleventh preferred embodiment is different from that of the eighth preferred embodiment (FIG. 8) in that the camera control circuit 4 of the eleventh preferred embodiment further comprises the YUV output unit 411. The YUV output unit 411 is an interface for outputting the image signal picked up by the CCD 2 as a YUV signal.

Also in the eleventh preferred embodiment, since the camera control circuit 4 performs a control for display of the image picked up by the CCD 2, to thereby display the image on the LCD 11, like in the eighth preferred embodiment, it is possible to eliminate the time required for transferring the image from the camera control circuit 4 to the main processor circuit 5 and reduce the load on the main processor circuit 5. Further, in processing the picked-up image in the main processor circuit 5, since the image is transferred through the buses and the SAC 406, it is possible to reduce the transfer time as compared with the case of serial transfer.

Figure 11:
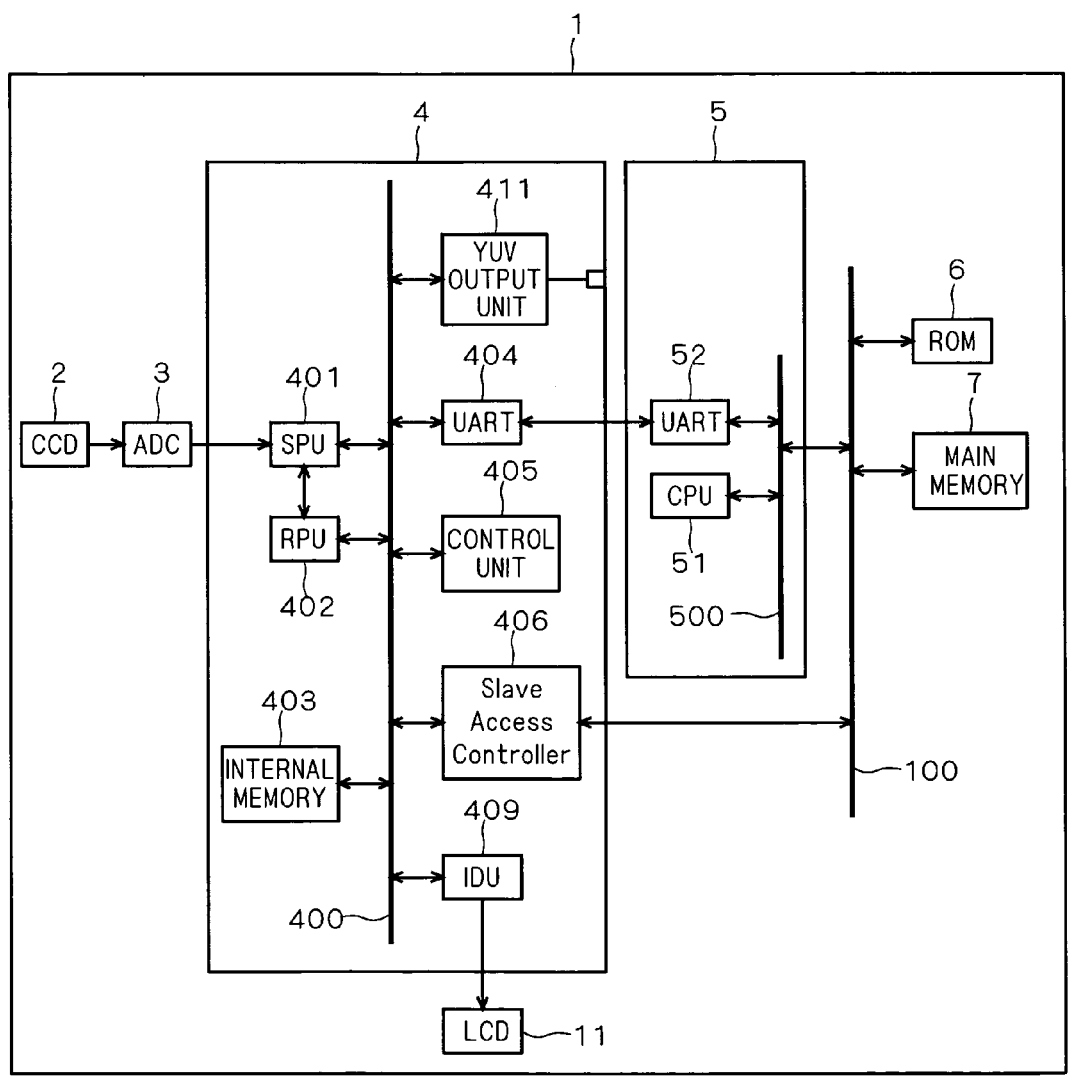
FIG. 11 is a block diagram showing a cellular phone including a camera control circuit in accordance with an eleventh preferred embodiment.

Though the main processor circuit 5 of FIG. 11 comprises no interface for inputting the YUV signal, the camera control circuit 4 of the eleventh preferred embodiment can transfer the image data through a YUV interface if connected to a main processor circuit comprising an interface for inputting the YUV signal. Thus, since the camera control circuit 4 of the eleventh preferred embodiment transfers the image data to the main processor circuit through the buses if the main processor circuit has no YUV interface and transfers the YUV signal to the main processor circuit through the YUV interface if the main processor circuit has the YUV interface, the camera control circuit 4 of the eleventh preferred embodiment can be adapted to various types of main processor circuits.

The Twelfth Preferred Embodiment

Next, the twelfth preferred embodiment of the present invention will be discussed, referring to FIG. 12. The camera control circuit 4 of the twelfth preferred embodiment is different from that of the first preferred embodiment (FIG. 1) in that the camera control circuit 4 of the twelfth preferred embodiment further comprises a dual port memory 412. Further, in the twelfth preferred embodiment, the camera control circuit 4 and the main processor circuit 5 comprise no serial communication interface.

The dual port memory 412 is connected to the buses 400 and 100, and the control unit 405 of the camera control circuit 4 and the CPU 51 of the main processor circuit 5 can simultaneously get access to the dual port memory 412. It is thereby possible to transfer data between the camera control circuit 4 and the main processor circuit 5.

In the twelfth preferred embodiment, in processing the image picked up by the CCD 2 in the main processor circuit 5, since the compressed image data stored in the internal memory 403 is transferred to the main processor circuit 5 through the buses and the SAC 406, like in the first preferred embodiment, it is possible to reduce the image transfer time as compared with the case of serial communication.

Then, though the SAC 406 is used as discussed above when a large amount of data, such as image data, are transferred to the main processor circuit 5, when a small amount of data, such as command data, are exchanged between the camera control circuit 4 and the main processor circuit 5, the data can be transferred through the dual port memory 412.

Further, also when a startup program for starting the operation of the camera control circuit 4 is downloaded, the dual port memory 412 can be used. For example, the CPU 51 writes the startup program for starting the operation of the camera control circuit 4 which is stored in the ROM 6 into the dual port memory 412 and the control unit 405 executes the startup program written in the dual port memory 412, to thereby starting the operation of the camera control circuit 4. After starting the operation of the camera control circuit 4, by saving the startup program from the dual port memory 412, the dual port memory 412 can be used for various data exchanges between the camera control circuit 4 and the main processor circuit 5.

The Thirteenth Preferred Embodiment

Figure 13:
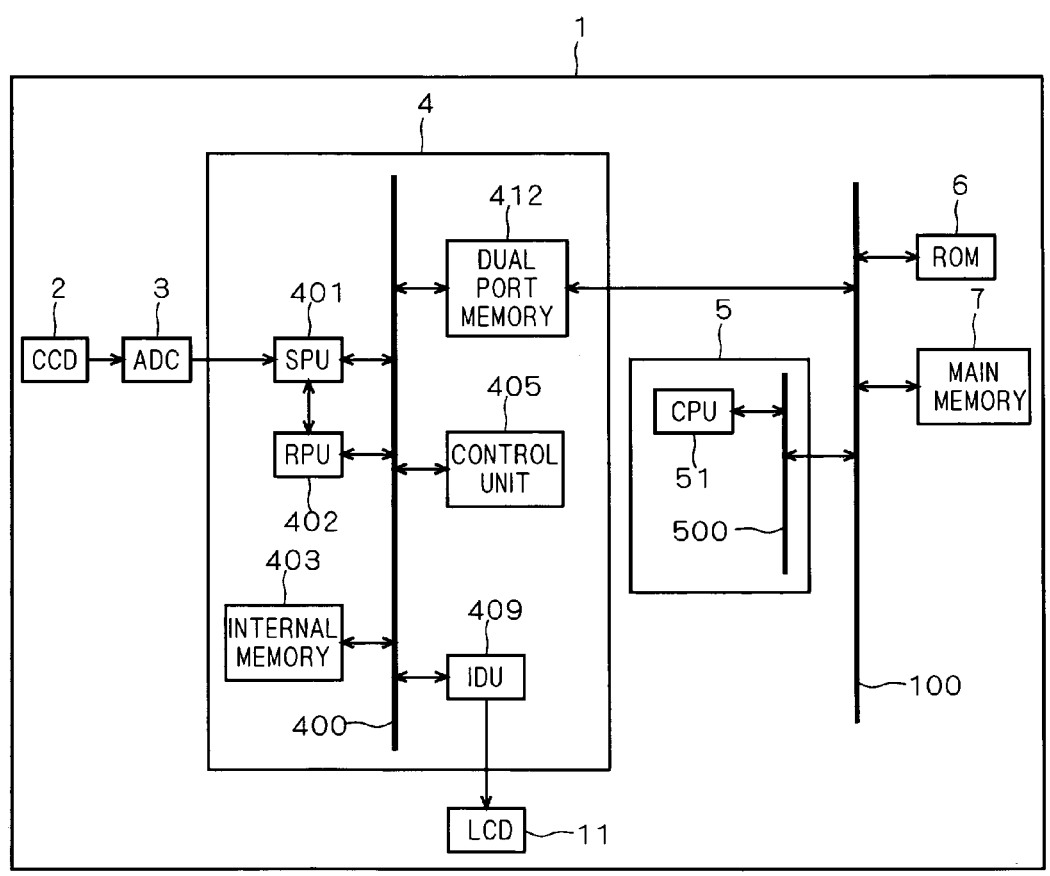
FIG. 13 is a block diagram showing a cellular phone including a camera control circuit in accordance with a thirteenth preferred embodiment.

Next, the thirteenth preferred embodiment of the present invention will be discussed, referring to FIG. 13. The camera control circuit 4 of the thirteenth preferred embodiment is different from that of the fifth preferred embodiment (FIG. 5) in that the camera control circuit 4 of the thirteenth preferred embodiment further comprises the dual port memory 412. Further, in the thirteenth preferred embodiment, the camera control circuit 4 and the main processor circuit 5 comprise no serial communication interface.

The dual port memory 412 is connected to the buses 400 and 100, and the control unit 405 of the camera control circuit 4 and the CPU 51 of the main processor circuit 5 can simultaneously get access to the dual port memory 412. It is thereby possible to transfer data between the camera control circuit 4 and the main processor circuit 5.

Also in the thirteenth preferred embodiment, since the camera control circuit 4 performs a control for display of the image picked up by the CCD 2, to thereby display the image on the LCD 11, it is possible to eliminate the time required for transferring the image data to the main processor circuit 5 and reduce the load on the main processor circuit 5. Further, in an operation which needs less degree of real time, unlike the display of image data on the LCD, it is possible to perform processing of the picked-up image data also in the main processor circuit 5 by transferring the image data through the dual port memory 412. Furthermore, as discussed in the twelfth preferred embodiment, it is possible to use the dual port memory 412 when the startup program for the camera control circuit 4 is downloaded.

The Fourteenth Preferred Embodiment

Next, the fourteenth preferred embodiment of the present invention will be discussed, referring to FIG. 14. The camera control circuit 4 of the fourteenth preferred embodiment is different from that of the first preferred embodiment (FIG. 1) in that the camera control circuit 4 of the fourteenth preferred embodiment further comprises the dual port memory 412 and the YUV output unit 411 which is an output interface for the YUV signal. In the fourteenth preferred embodiment, the camera control circuit 4 and the main processor circuit 5 comprise no serial communication interface. Further, the camera control circuit 4 comprises no SAC 406.

Though the main processor circuit 5 of FIG. 14 comprises no interface for inputting the YUV signal, the camera control circuit 4 of the fourteenth preferred embodiment can transfer the image data through the YUV interface if connected to a main processor circuit comprising an interface for inputting the YUV signal.

Thus, since the camera control circuit 4 of the fourteenth preferred embodiment transfers the image data to the main processor circuit through the dual port memory 412 if the main processor circuit has no YUV interface and transfers the YUV signal to the main processor circuit through the YUV interface if the main processor circuit has the YUV interface, the camera control circuit 4 of the fourteenth preferred embodiment can be adapted to various types of main processor circuits. Further, as discussed in the twelfth preferred embodiment, it is possible to use the dual port memory 412 when the startup program for the camera control circuit 4 is downloaded.

The Fifteenth Preferred Embodiment

Next, the fifteenth preferred embodiment of the present invention will be discussed, referring to FIG. 15. The camera control circuit 4 of the fifteenth preferred embodiment is different from that of the eighth preferred embodiment (FIG. 8) in that the camera control circuit 4 of the fifteenth preferred embodiment further comprises the dual port memory 412. Further, in the fifteenth preferred embodiment, the camera control circuit 4 and the main processor circuit 5 comprise no serial communication interface. Furthermore, in the fifteenth preferred embodiment, though the camera control circuit 4 comprises the internal memory 403 and the picked-up image data is stored in the internal memory 403, the image data may be stored in the external memory like in the eighth preferred embodiment.

The dual port memory 412 is connected to the buses 400 and 100, and the control unit 405 of the camera control circuit 4 and the CPU 51 of the main processor circuit 5 can simultaneously get access to the dual port memory 412. It is thereby possible to transfer data between the camera control circuit 4 and the main processor circuit 5.

Also in the fifteenth preferred embodiment, in displaying the picked-up image on the LCD 11, since the camera control circuit 4 performs a display control, it is possible to eliminate the time required for transferring the image data from the camera control circuit 4 to the main processor circuit 5. Further, in processing the picked-up data in the main processor circuit 5, since the image data is transferred to the main processor circuit 5 through the buses and the SAC 406, it is possible to reduce the transfer time as compared with the case of serial communication. For the relatively small amount of data, such as command data, data exchange can be performed between the camera control circuit 4 and the main processor circuit 5 through the dual port memory 412. Further, as discussed above, it is possible to use the dual port memory 412 when the startup program for the camera control circuit 4 is downloaded.

The Sixteenth Preferred Embodiment

Figure 16:
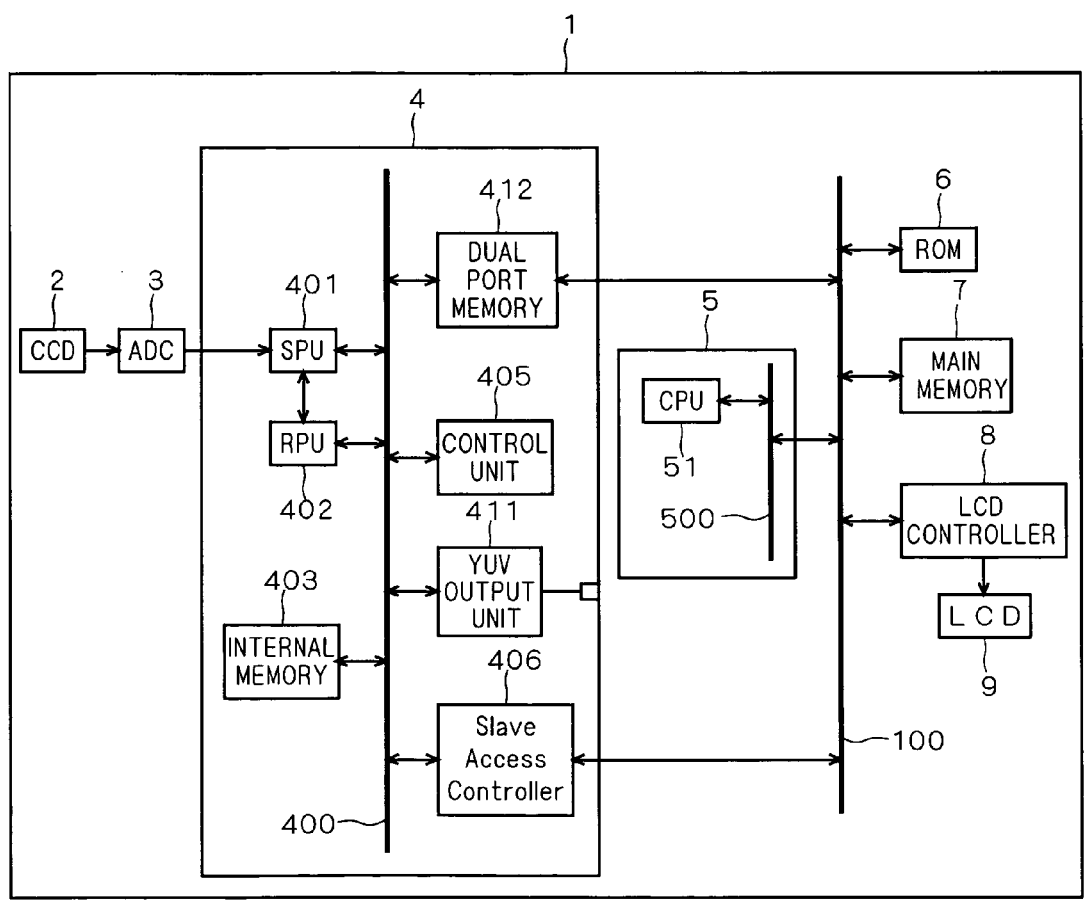
FIG. 16 is a block diagram showing a cellular phone including a camera control circuit in accordance with a sixteenth preferred embodiment.

Next, the sixteenth preferred embodiment of the present invention will be discussed, referring to FIG. 16. The camera control circuit 4 of the sixteenth preferred embodiment is different from that of the ninth preferred embodiment (FIG. 9) in that the camera control circuit 4 of the sixteenth preferred embodiment further comprises the dual port memory 412. The dual port memory 412 is connected to the bus 400 inside the camera control circuit 4 and the external bus 100. Further, in the sixteenth preferred embodiment, the camera control circuit 4 and the main processor circuit 5 comprise no serial communication interface.

Also in the sixteenth preferred embodiment, since the image data is transferred to the main processor circuit 5 through the buses and the SAC 406, like in the ninth preferred embodiment, it is possible to reduce the transfer time as compared with the case of serial communication. Further, since the camera control circuit 4 of the sixteenth preferred embodiment transfers the YUV signal to the main processor circuit through the YUV interface if connected to the main processor circuit having the YUV interface, the camera control circuit 4 of the sixteenth preferred embodiment can be adapted to various types of main processor circuits. It is also possible to exchange data between the camera control circuit 4 and the main processor circuit 5 through the dual port memory 412. Furthermore, as discussed above, it is possible to use the dual port memory 412 when the startup program for the camera control circuit 4 is downloaded.

The Seventeenth Preferred Embodiment

Next, the seventeenth preferred embodiment of the present invention will be discussed, referring to FIG. 17. The camera control circuit 4 of the seventeenth preferred embodiment is different from that of the tenth preferred embodiment (FIG. 10) in that the camera control circuit 4 of the seventeenth preferred embodiment further comprises the dual port memory 412. The dual port memory 412 is connected to the bus 400 inside the camera control circuit 4 and the external bus 100. Further, in the seventeenth preferred embodiment, the camera control circuit 4 and the main processor circuit 5 comprise no serial communication interface.

Also in the seventeenth preferred embodiment, since the camera control circuit 4 performs a control for display of the image picked up by the CCD 2, to thereby display the image on the LCD 11, like in the tenth preferred embodiment, it is possible to eliminate the time required for transferring the image from the camera control circuit 4 to the main processor circuit 5. Further, the camera control circuit 4 of the seventeenth preferred embodiment can transfer the image data to the main processor circuit through the YUV interface if connected to the main processor circuit having the interface for inputting the YUV signal. It is also possible to exchange data between the camera control circuit 4 and the main processor circuit 5 through the dual port memory 412. Furthermore, as discussed above, it is possible to use the dual port memory 412 when the startup program for the camera control circuit 4 is downloaded.

The Eighteenth Preferred Embodiment

Figure 18:
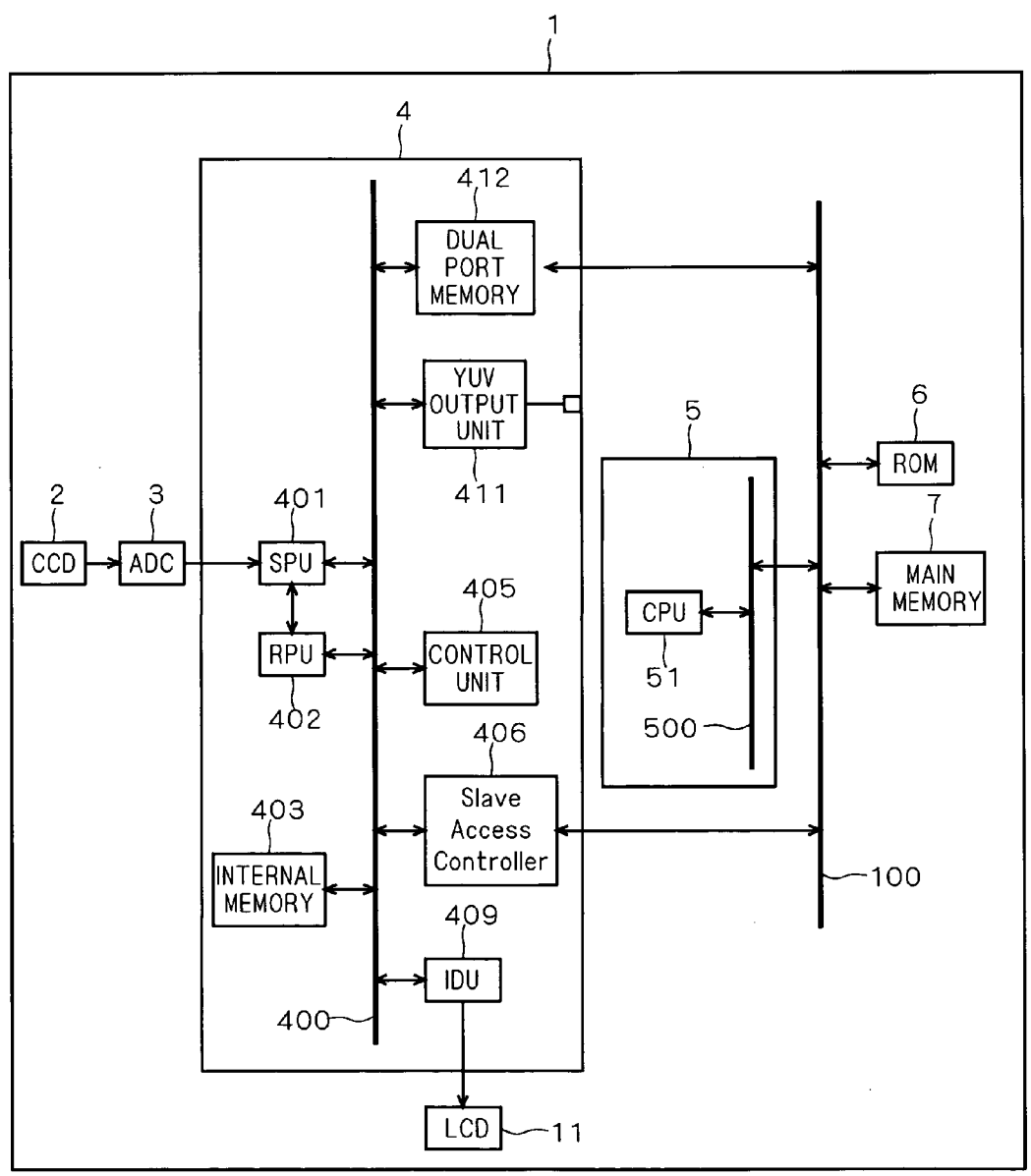
FIG. 18 is a block diagram showing a cellular phone including a camera control circuit in accordance with an eighteenth preferred embodiment.

Next, the eighteenth preferred embodiment of the present invention will be discussed, referring to FIG. 18. The camera control circuit 4 of the eighteenth preferred embodiment is different from that of the eleventh preferred embodiment (FIG. 11) in that the camera control circuit 4 of the eighteenth preferred embodiment further comprises the dual port memory 412. The dual port memory 412 is connected to the bus 400 inside the camera control circuit 4 and the external bus 100. Further, in the eighteenth preferred embodiment, the camera control circuit 4 and the main processor circuit 5 comprise no serial communication interface.

Also in the eighteenth preferred embodiment, since the camera control circuit 4 performs a control for display of the image picked up by the CCD 2, to thereby display the image on the LCD 11, like in the eleventh preferred embodiment, it is possible to eliminate the time required for transferring the image from the camera control circuit 4 to the main processor circuit 5. The camera control circuit 4 of the eighteenth preferred embodiment can transfer the image data to the main processor circuit through the YUV interface if connected to the main processor circuit having the interface for inputting the YUV signal. Further, the camera control circuit 4 of the eighteenth preferred embodiment can transfer the image data to the main processor circuit through the buses and the SAC 406 if connected to the main processor circuit having no interface for inputting the YUV signal. It is also possible to exchange data between the camera control circuit 4 and the main processor circuit 5 through the dual port memory 412. Furthermore, as discussed above, it is possible to use the dual port memory 412 when the startup program for the camera control circuit 4 is downloaded.

<Variation>

Though discussions have been made on the case where the camera control circuit 4 is integrated into the cellular phone 1 in the above-discussed preferred embodiments, the camera control circuit of the present invention can be integrated into various electronic equipments other than the cellular phone, to add the image pickup function to the electronic equipments, and also in such a case, the above-discussed effects are produced. For example, the camera control device of the present invention can be applied to a personal handy phone system (PHS: trademark) with camera function, various PDAs (personal digital assistants) with camera function or the like. Further, the camera control device of the present invention can be also applied to an IC recorder with camera function or the like.

While the invention has been shown and described in detail, the foregoing description is in all aspects illustrative and not restrictive. It is therefore understood that numerous modifications and variations can be devised without departing from the scope of the invention.

What is claimed is:

1. A camera control device integrated into an electronic equipment, comprising:
    an input circuit connected to an internal bus inside said camera control device and configured to input an image signal output from an image pickup sensor;
    a memory device connected directly only to the internal bus inside said camera control device and configured to store said image signal output from said image pickup sensor;
    a slave access controller provided entirely inside said camera control device and connected to said internal bus and directly to an external bus provided outside said camera control device;
    a serial interface connected to the internal bus inside said camera control device and to a second serial interface that is inside a processing unit including a CPU and that is connected to a second internal bus, physically distinct from the external bus, inside the processing unit, the serial interface configured to transfer a startup program for the camera control device from the processing unit,
    wherein the CPU is provided outside said camera control device, performs a general control of said electronic equipment and reads out said image signal stored as a compressed image in said memory device by sending a read instruction to the slave access controller which uses a predetermined circuit unit to transfer the compressed image from the memory device to the slave access controller which transfers the compressed image to the CPU through said external bus, and
    wherein said memory device is not directly controlled by the CPU.

2. The camera control device according to claim 1, further comprising
    an element for compressing said image signal inputted from said image pickup sensor.

3. The camera control device according to claim 1, wherein said memory device includes an internal memory provided inside said camera control device.

4. The camera control device according to claim 1, wherein said electronic equipment includes an external memory connected to the outside of said camera control device, and
    said external memory is connected to said internal bus through a memory interface circuit.

5. The camera control device according to claim 1, further comprising
    a DMA (Direct Memory Access) controller,
    wherein said DMA controller transfers said image signal stored in said memory device to said slave access controller.

6. The camera control device according to claim 5, further comprising
    an interface for allowing said DMA controller to perform a direct DMA transfer to the outside of said camera control device not through said slave access controller.

7. The camera control device according to claim 1, further comprising
an interface used for outputting said image signal outputted from said image pickup sensor as a YUV signal to the outside of said camera control device.

8. The camera control device according to claim 1, wherein
said electronic equipment is a cellular phone and said CPU is a CPU which performs a general control of said cellular phone.

9. The camera control device according to claim 1, further comprising:
a control unit connected to the internal bus and including a second CPU, the control unit configured to control storing of said image signal output from said image pickup sensor into the memory device.

10. The camera control device according to claim 1, wherein the second internal bus inside the processing unit is connected to the external bus.

11. A camera control device integrated into an electronic equipment, comprising:
an input circuit connected to an internal bus inside said camera control device and configured to input an image signal output from an image pickup sensor;
a memory device connected directly only to the internal bus inside said camera control device and configured to store said image signal output from said image pickup sensor;
a slave access controller provided entirely inside said camera control device and connected to said internal bus and directly to an external bus provided outside said camera control device;
a display control circuit connected to a display device and said internal bus inside said camera control device; and
a control unit configured to send a display instruction for displaying an image acquired by said image pickup sensor to said display control circuit not under control of a CPU,
wherein the CPU is provided outside said camera control device, performs a general control of said electronic equipment and reads out said image signal stored as a compressed image in the memory device by sending a read instruction to the slave access controller which uses a predetermined circuit unit to transfer the compressed image from the memory device to the slave access controller which transfers the compressed image to the CPU through the external bus; and
a serial interface connected to the internal bus inside said camera control device and to a second serial interface that is inside a processing unit including the CPU and that is connected to a second internal bus, physically distinct from the external bus, inside the processing unit, the serial interface configured to transfer a startup program for the camera control device from the processing unit, and
wherein said memory device is not directly controlled by the CPU.

12. The camera control device according to claim 11, further comprising
an interface used for outputting said image signal outputted from said image pickup sensor as a YUV signal to the outside of said camera control device.

13. The camera control device according to claim 11, wherein
said electronic equipment is a cellular phone and said CPU is a CPU which performs a general control of said cellular phone.

* * * * *